United States Patent
Chen et al.

(10) Patent No.: US 11,173,661 B2
(45) Date of Patent: Nov. 16, 2021

(54) 3D PRINTING HEAD HAVING ELECTRICALLY DESCENDIBLE NOZZLE

(71) Applicants: XYZPRINTING, INC., New Taipei (TW); KINPO ELECTRONICS, INC., New Taipei (TW)

(72) Inventors: Chien-Chih Chen, New Taipei (TW); Shih-Wei Huang, New Taipei (TW); Yang-Teh Lee, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 17 days.

(21) Appl. No.: 16/744,044

(22) Filed: Jan. 15, 2020

(65) Prior Publication Data

US 2021/0078247 A1    Mar. 18, 2021

(30) Foreign Application Priority Data

Sep. 17, 2019  (CN) .......................... 201910876790.2

(51) Int. Cl.
*B29C 64/209*  (2017.01)
*B33Y 30/00*  (2015.01)

(52) U.S. Cl.
CPC ............ *B29C 64/209* (2017.08); *B33Y 30/00* (2014.12)

(58) Field of Classification Search
CPC ... B29C 64/106; B29C 64/118; B29C 64/209; B33Y 30/00
See application file for complete search history.

(56) References Cited

U.S. PATENT DOCUMENTS

| | | | |
|---|---|---|---|
| 7,026,574 B2 * | 4/2006 | Belfiore | B23K 9/124 219/137.7 |
| 9,694,545 B2 * | 7/2017 | Skubic | B29C 64/35 |

(Continued)

FOREIGN PATENT DOCUMENTS

| | | |
|---|---|---|
| CN | 204431740 U | 7/2015 |
| CN | 105291436 A | 2/2016 |

(Continued)

OTHER PUBLICATIONS

Office Action dated Dec. 21, 2020 of the corresponding Korean patent application No. 10-2020-0004906.

(Continued)

*Primary Examiner* — Joseph S Del Sole
*Assistant Examiner* — Manley L Cummins, IV
(74) *Attorney, Agent, or Firm* — Chun-Ming Shih; HDLS IPR Services

(57) ABSTRACT

A 3D printing head having a carrier, a pair of nozzle assemblies, a swing arm and a driving mechanism is provided. The nozzle assemblies are arranged on the carrier. Each nozzle assembly has a nozzle and a reset elastic member. Each nozzle is connected to the carrier and up-down movable relative to the carrier. The reset elastic members are connected between the carrier and the respective corresponding nozzles. The swing arm is pivoted on the carrier and able to swing one end thereof between the nozzles to selectively press one of the nozzles down. The driving mechanism is connected with the swing arm to rotate the swing arm. The swing arm can be rotated by the driving mechanism to press the operated nozzle down for printing, and a height difference between the nozzles is thereby formed to prevent the product from being scratched by the idle nozzle when printing.

15 Claims, 18 Drawing Sheets

(56) References Cited

U.S. PATENT DOCUMENTS

| | | | | |
|---|---|---|---|---|
| 2007/0228590 A1* | 10/2007 | LaBossiere | ............ | B33Y 30/00 264/40.1 |
| 2014/0242208 A1* | 8/2014 | Elsworthy | ............. | B29C 31/042 425/375 |
| 2019/0084228 A1* | 3/2019 | Chen | ...................... | B29C 64/118 |
| 2021/0060859 A1* | 3/2021 | Li | ......................... | B29C 64/227 |

FOREIGN PATENT DOCUMENTS

| | | | |
|---|---|---|---|
| CN | 106217880 | * | 12/2016 |
| CN | 106217880 A | | 12/2016 |
| CN | 207682959 U | | 8/2018 |
| KR | 20150102244 A | | 9/2015 |
| KR | 20180068406 A | | 6/2018 |
| KR | 101953789 | * | 5/2019 |

OTHER PUBLICATIONS

Office Action dated Feb. 5, 2020 of the corresponding Taiwan patent application.

* cited by examiner

3D PRINTING HEAD HAVING ELECTRICALLY DESCENDIBLE NOZZLE

BACKGROUND OF THE INVENTION

1. Technical Field

The technical field relates to a 3D printing device, and more particularly to a 3D printing head having two electrically descendible nozzles.

2. Description of Related Art

This disclosure is directed to a 3D printing device, in particularly to a Fused Deposition Modeling (FDM) 3D printing device. In general, plastic filaments are melted by a heated nozzle, and then squeezed out to a predetermined position, and finally cooled and cured into a fixed shape. At present, the conventional FDM printing device may come with two nozzles provided for printing plastic materials of different colors. During printing, both nozzles are moved with the printing head simultaneously. While one of the nozzles is printing, the other idle nozzle may scratch the product whenever the idle nozzle passes through the product.

In view of the aforementioned drawback of the prior art, the discloser of this disclosure based on years of experience in the related industry to conduct extensive research and experiment, and finally provided a feasible solution as disclosed in this disclosure to overcome the drawback of the prior art.

SUMMARY OF THE INVENTION

Therefore, it is a primary object of this disclosure to provide a 3D printing head having an electrically descendible nozzle to overcome the aforementioned drawback of the prior art.

To achieve the aforementioned and other objectives, this disclosure discloses an embodiment of a 3D printing head having an electrically descendible nozzle comprising a carrier, a pair of nozzle assemblies, a swing arm and a driving mechanism. The nozzle assembly is disposed on the carrier, and each nozzle assembly comprises a nozzle and a reset elastic member and the nozzle assembly is movably coupled to the carrier and capable of moving up and down relative to the carrier, and each reset elastic member is coupled between the carrier and the corresponding nozzle and capable of lifting each nozzle relative to the carrier. The swing arm is pivotally coupled to the carrier and capable of swinging and moving an end of the swing arm to a position between the pair of nozzles and selectively pressing one of the nozzles down. The driving mechanism is coupled to the swing arm for driving the swing arm to rotate and swing.

In an embodiment of this disclosure, the swing arm and the carrier have a pivot point situated between the pair of nozzles. An auxiliary steering elastic member is coupled between both sides of the swing arm and the carrier for assisting pulling the swing arm to change its direction. A positioning elastic member is coupled between the swing arm and the carrier for driving the swing arm to press and position the nozzle. The positioning elastic member swings together with the swing arm, and the positioning elastic member and the carrier have a junction situated between the pair of nozzles.

In an embodiment of this disclosure, comprises a casing and a retaining frame contained in the casing, and the pair of nozzle assemblies are contained in the casing and movably coupled to the retaining frame. The carrier has a positioning hole formed thereon, and the positioning hole is a straight through hole or a downwardly tapered hole in a shape corresponding to the nozzle, and when the nozzle descends, the positioning hole is exposed from the casing, and the lower tip of the nozzle is positioned against an inner edge of the positioning hole.

In an embodiment of this disclosure, each of the nozzles is provided with a press plate respectively, and an edge of the press plate forms a slope surface, and the swing arm can be moved to the corresponding press plate by any one of the slope surfaces to press the corresponding nozzle.

In an embodiment of this disclosure, there are a plurality of swing arms, and the swing arms coaxially rotate with each other.

In an embodiment of this disclosure, a guide wheel is pivoted at the swing arm for selectively pushing one of the nozzles.

In an embodiment of this disclosure, the driving mechanism comprises a power shaft and a drive gear sheathed on the power shaft, and the swing arm has a rack extending in a curve using the pivoting center of the swing arm as the center, and the drive gear is engaged with the rack, so that the power shaft can drive the swing arm to swing within the curved extending range of the rack.

In an embodiment of this disclosure, the driving mechanism comprises a power shaft and a pair of drive gears, and the power shaft is passed through each drive gear and mechanically powered and coupled between the pair of drive gears by a steering clutch mechanism, and the steering clutch mechanism comprises a pair of spiral springs corresponding to the drive gears respectively, and the pair of spiral springs are sheathed on the power shaft and fixed to the corresponding drive gears respectively, and the swing arm has a pair of racks corresponding to the drive gears respectively, and each rack is extended in a curve by using the pivoting center of the swing arm as the center, and each drive gear is engaged with each respective rack, so that when the power shaft rotates in any one direction, the power shaft drives the pair of spiral springs to be twisted in opposite direction, and one of the spiral springs is contracted radially to tighten the power shaft and the other spiral spring is expanded radially to loosen the power shaft, and the power shaft is capable of applying a force by each drive gear to drive the swing arm to swing bi-directionally within the curved extending range of each rack. Wherein, each spiral spring has one of the ends coupled to the corresponding drive gear and the other end coupled to the other corresponding drive gear.

In an embodiment of this disclosure, the swing arm is pivoted to the carrier by a pivot shaft, and the pivot shaft is pivotally coupled to the carrier and the pivot shaft is passed and coupled to the swing arm, and a compression spring is sheathed on the pivot shaft, and both ends of the compression spring press and couple the carrier and the swing arm respectively.

In an embodiment of this disclosure, the carrier has a lifting guide rail installed thereon, and each nozzle assembly has a guiding structure engaged with the lifting guide rail.

In this embodiment, the 3D printing head having an electrically descendible nozzle drives the swing arm to rotate by the driving mechanism in order to push the nozzle to descend for printing. Therefore, a simple structure can ascend and descend the nozzles to produce a height difference between the two nozzles and prevent the product from being scratched by the idle nozzle during printing.

DESCRIPTION OF THE PREFERRED EMBODIMENTS

The technical contents of this disclosure will become apparent with the detailed description of preferred embodiments accompanied with the illustration of related drawings as follows. It is intended that the embodiments and drawings disclosed herein are to be considered illustrative rather than restrictive.

With reference to FIGS. 1 to 6 for a 3D printing head having an electrically descendible nozzle in accordance with the first embodiment of this disclosure, the 3D printing head having an electrically descendible nozzle comprises a carrier 100, a pair of nozzle assemblies 200, a swing arm 300 and a driving mechanism 400.

Figure 1:
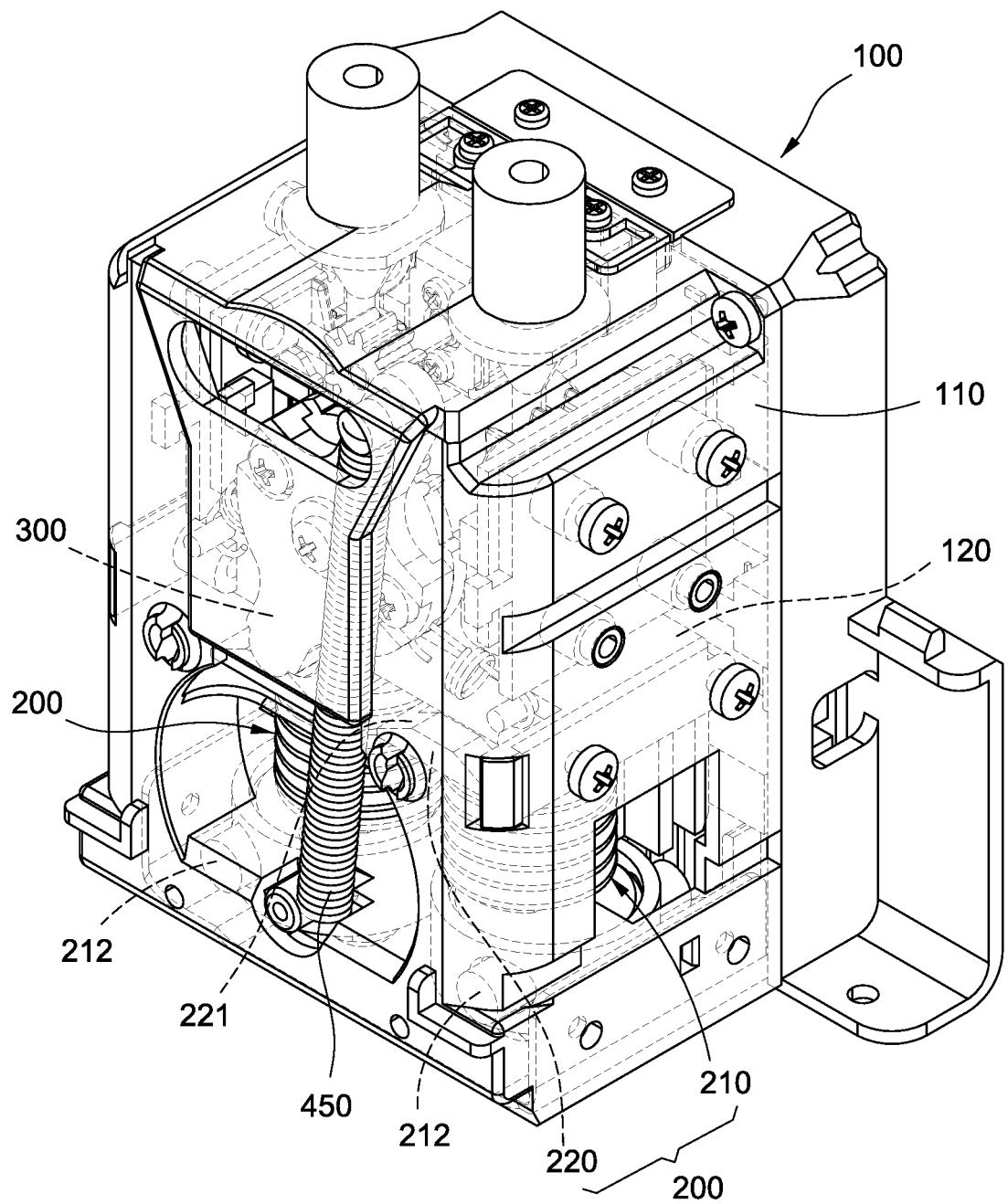
FIG. 1 is a perspective view of a 3D printing head having an electrically descendible nozzle in accordance with a first embodiment of this disclosure.
Figure 6:
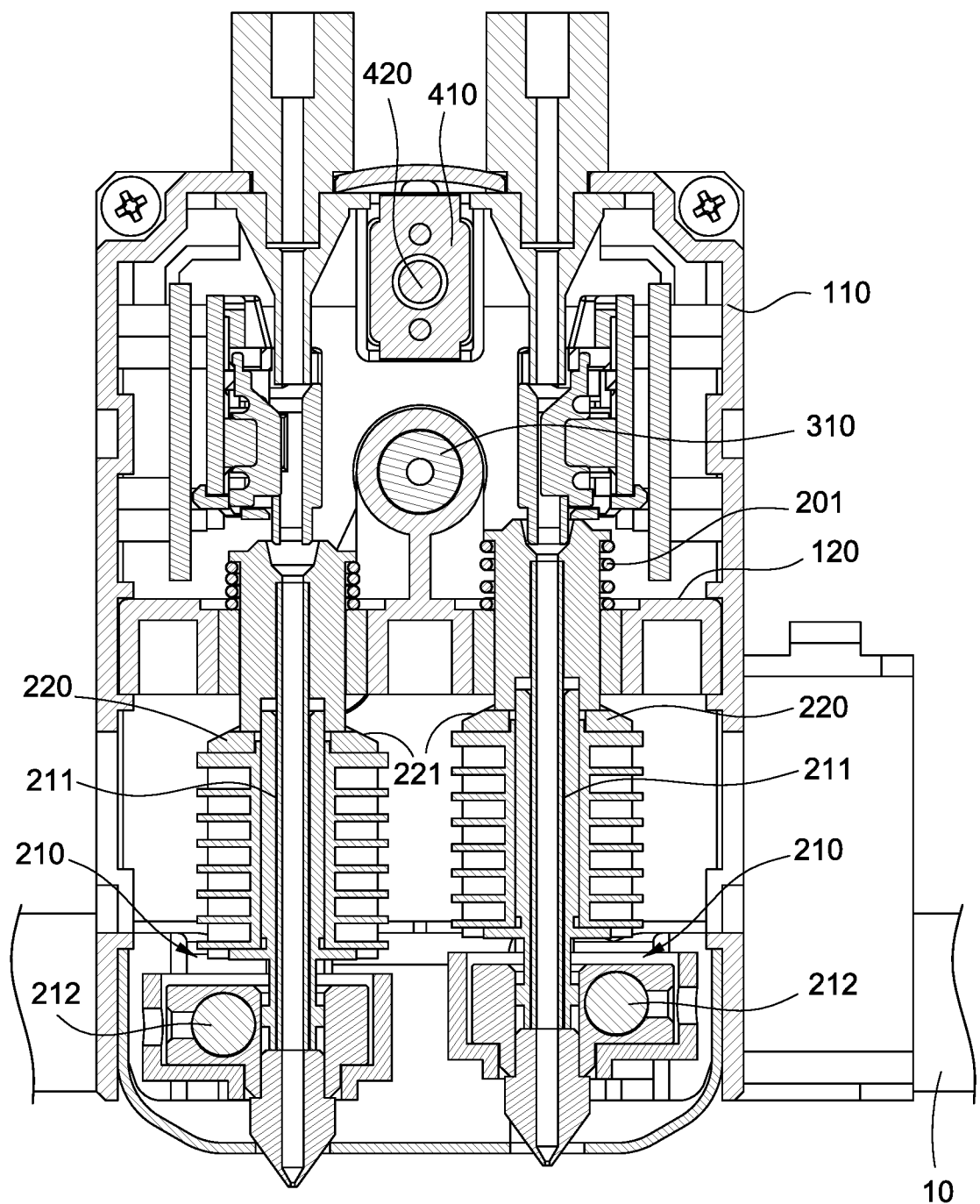
FIG. 6 is a cross-sectional view of a 3D printing head having an electrically descendible nozzle in accordance with the first embodiment of this disclosure.
Figure 7:
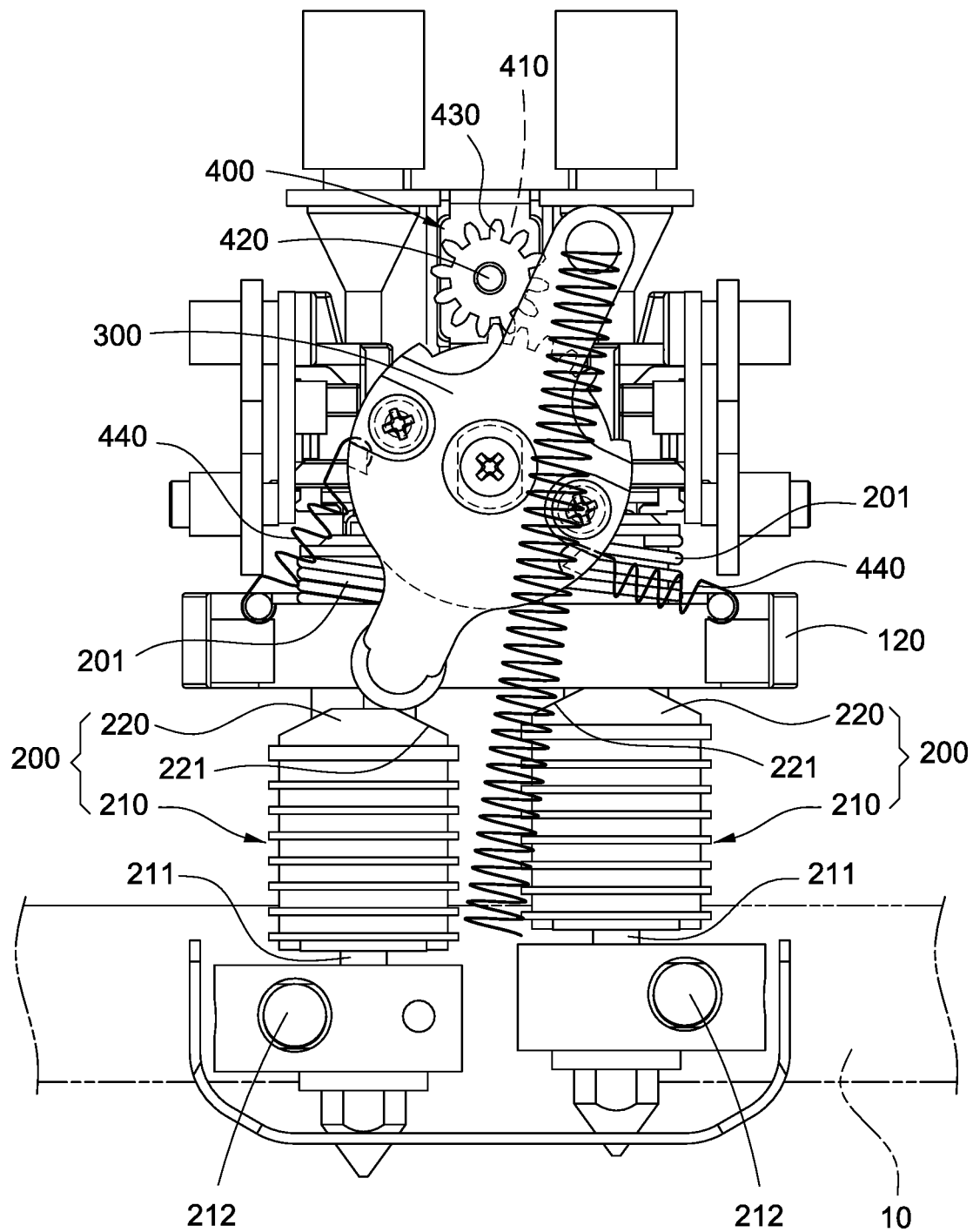
FIGS. 7 to 9 are schematic views showing the operation of a 3D printing head having an electrically descendible nozzle in accordance with the first embodiment of this disclosure.
Figure 8:
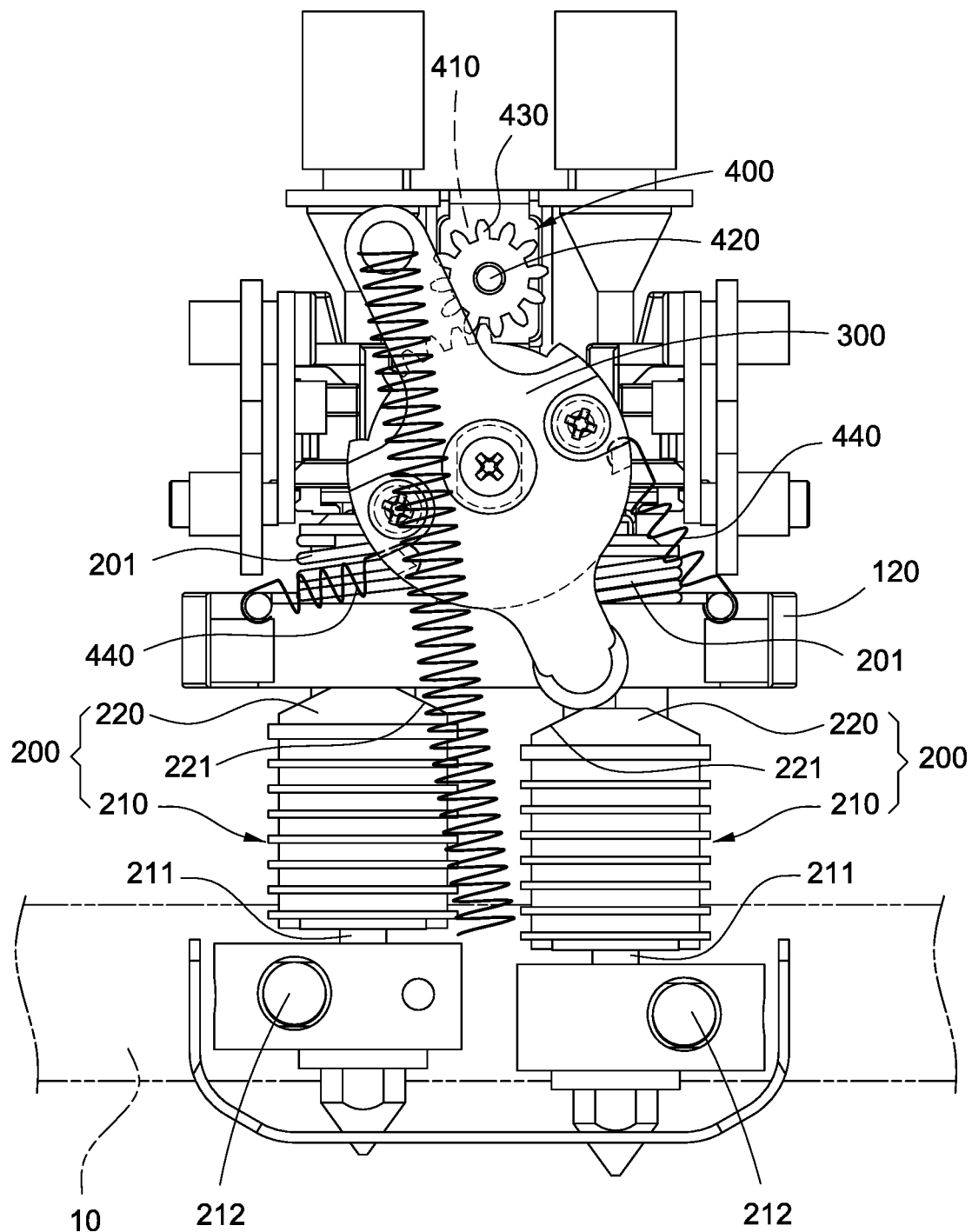

In FIGS. 1 and 6, the carrier 100 is provided for coupling a horizontal slide rail 10, so that the 3D printing head having an electrically descendible nozzle of this disclosure can slide horizontally along the horizontal slide rail 10. Specifically, the carrier 100 comprises a casing 110 and a retaining frame 120 contained in the casing 110. In this embodiment, the retaining frame 120 is made of plastic and the casing 110 is formed by bending and combining a metal sheet, but this disclosure is not limited to such arrangement only. A side of the casing 110 is coupled to the horizontal slide rail 10 and the casing 110 may be coupled to the horizontal slide rail 10 indirectly by a plastic component according to actual configuration requirements.

In FIGS. 1, 2, 5 and 6, the nozzle assembly 200 is contained in the casing 110 and disposed on the carrier 100. Each nozzle assembly 200 comprises a nozzle 210 and a reset elastic member 201, and each nozzle 210 is movably coupled to the carrier 100 and capable of moving up and down relative to the carrier 100. The pair of nozzles 210 are movably coupled to the retaining frame 120 and capable of moving up and down relative to the retaining frame 120. Specifically, each nozzle 210 has a feed tube 211 with an upper end movably and vertically passing through the retaining frame 120, and a lower end having a heater 212 for melting filaments inputted into the feed tube 211, and the melted filaments are squeezed downwardly out from the lower end of the feed tube 211. Each reset elastic member 201 is coupled between the carrier 100 and the corresponding nozzle 210 and capable of lifting each nozzle 210 relative to the carrier 100. In this embodiment, each reset elastic member 201 is sheathed on a cylindrical spring at the upper end of each feed tube 211, and the upper end of each reset elastic member 201 presses the sheathed feed tube 211, and the lower end of each reset elastic member 201 presses the top of the retaining frame 120. The carrier 100 has a lifting guide rail 130a/130b installed thereon, but the installation position is not limited. In this embodiment, retaining frame 120 has the lifting guide rail 130a, and the casing 110 also has the lifting guide rail 130b. Each nozzle assembly 200 has a guiding structure 230a/230b engaged with each respective lifting guide rail 130a/130b. The guiding structure 230a/230b is provided for guiding each nozzle assembly 200 to move up and down along each respective lifting guide rail 130a/130b.

In FIGS. 1 to 4 and 6, the swing arm 300 is pivotally coupled to the carrier 100, and the swing arm 300 is capable of swinging to move the lower end of the swing arm 300 to a position between the pair of nozzles 210 and selectively pressing one of the nozzles 210 to move down. Specifically, the swing arm 300 is pivotally coupled to the carrier 100 by a pivot shaft 310, and the pivot shaft 310 is horizontally disposed and passed through the retaining frame 120 and pivotally coupled to the carrier 100, and an end of the pivot shaft 310 is fixed to the swing arm 300, so that the swing arm 300 can swing by using the pivot shaft 310 as the center. The pivot shaft 310 has a compression spring 320 sheathed thereon, and both ends of the compression spring 320 press the retaining frame 120 and the swing arm 300 of the carrier 100 to produce friction to fix the swinging position of the swing arm 300. In a preferred embodiment, the pivot point of the swing arm 300 and the carrier 100 is situated between the pair of nozzles 210, and the swing arm 300 has a guide wheel 330 pivotally coupled to the lower end of the swing arm 300 to facilitate moving the swing arm 300 along the surface of the nozzle from the top to the a of the nozzle 210, so as to further press the nozzle 210 down.

In FIGS. 2 to 4 and 6 to 8, the driving mechanism 400 is linked to the swing arm 300 and capable of rotating the swing arm 300 to press one of the corresponding nozzles 210 down. In this embodiment, the driving mechanism 400 comprises a motor 410, a power shaft 420 coupled to the motor 410, and a drive gear 430 installed onto the power shaft 420, and the swing arm 300 has a rack 301 disposed thereon and extending in a curve by using the pivoting center of the swing arm 300 as the center, and the drive gear 430 is directly engaged with the rack 301. When the motor 410 rotates, the torque of the motor 410 overcomes the friction and drives the swing arm 300 to swing within the curved extending range of the rack 301.

Figure 9:
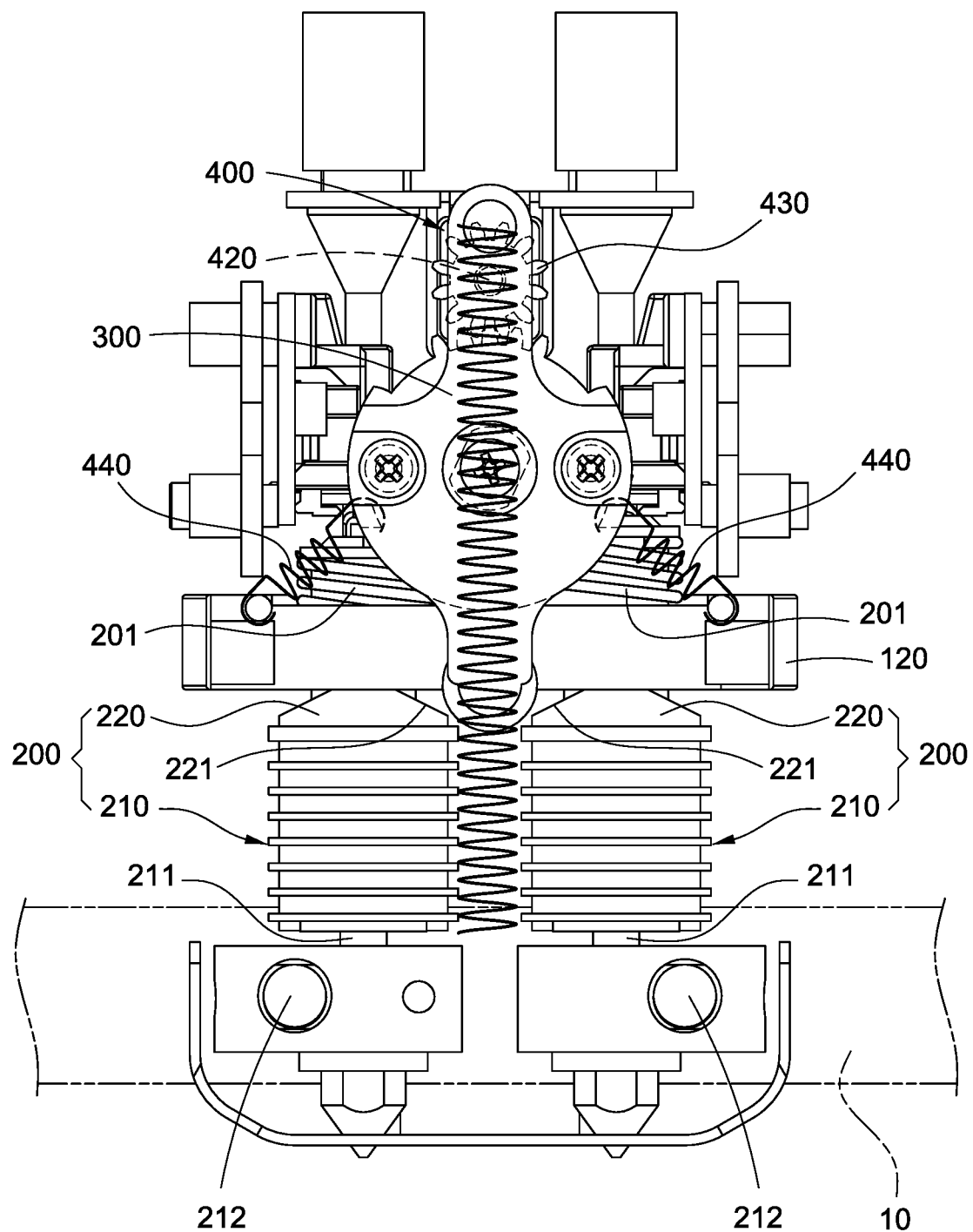
Figure 10:
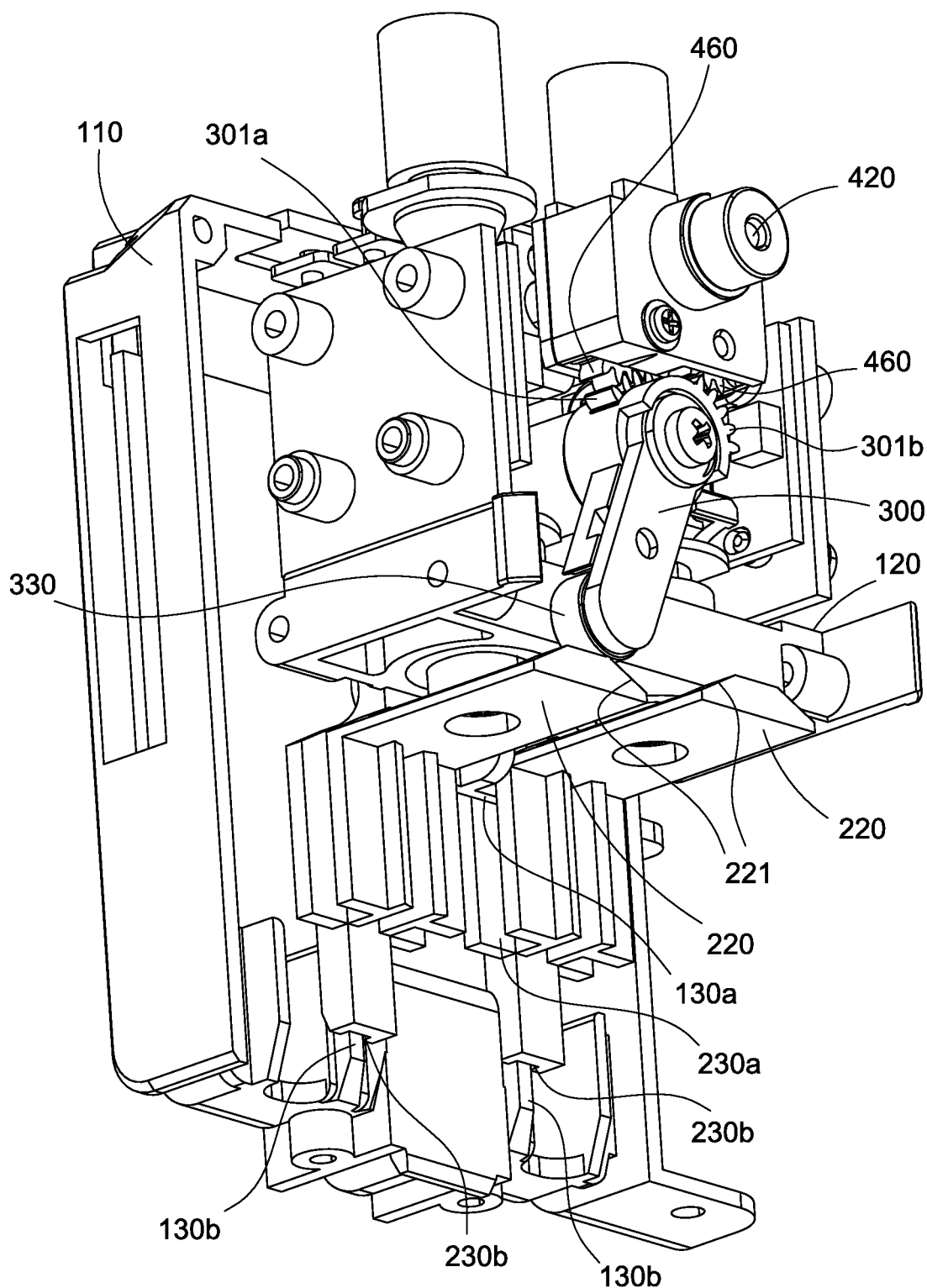
FIGS. 10 and 11 are perspective views of a 3D printing head having an electrically descendible nozzle in accordance with a second embodiment of this disclosure.
Figure 11:
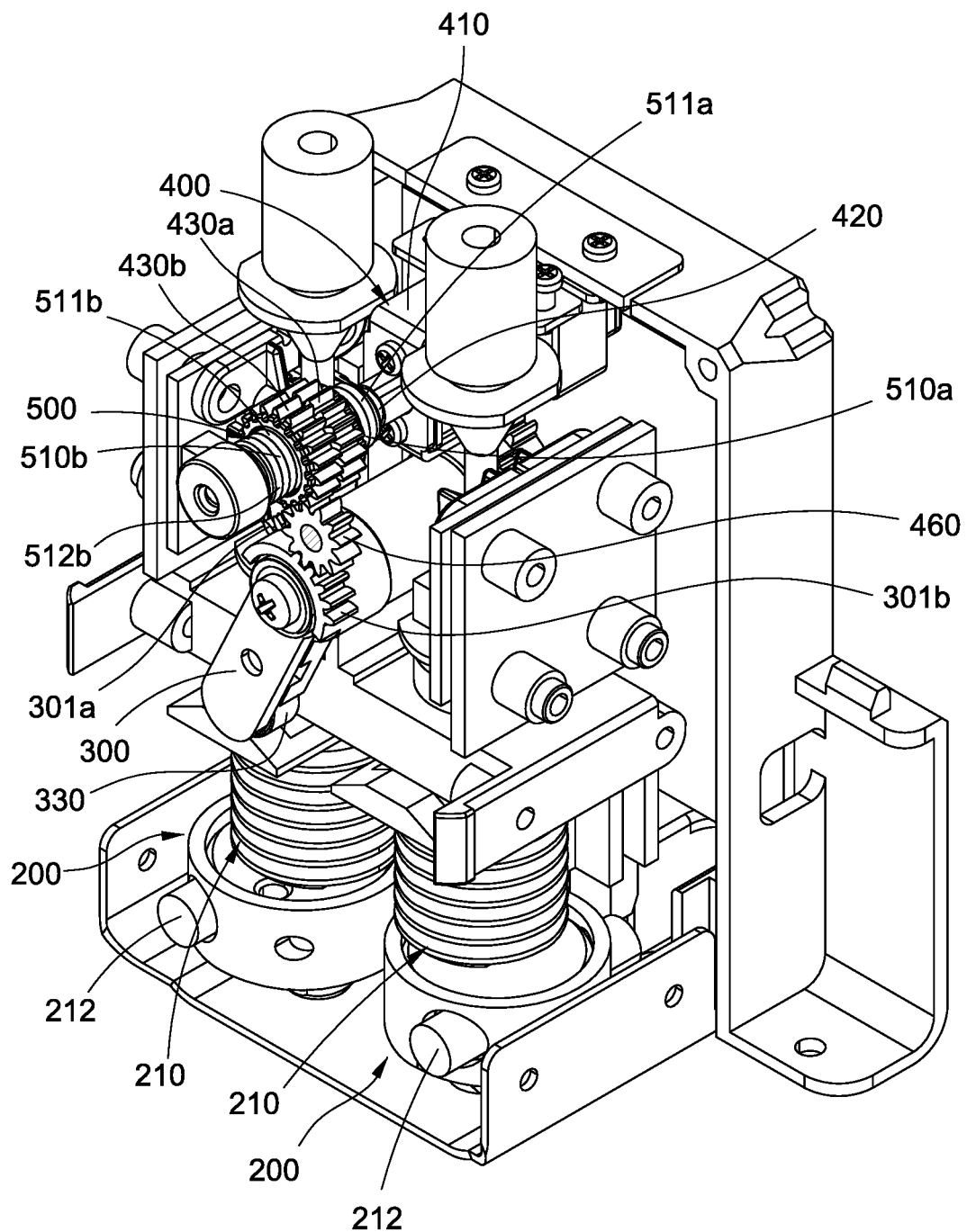
Figure 12:
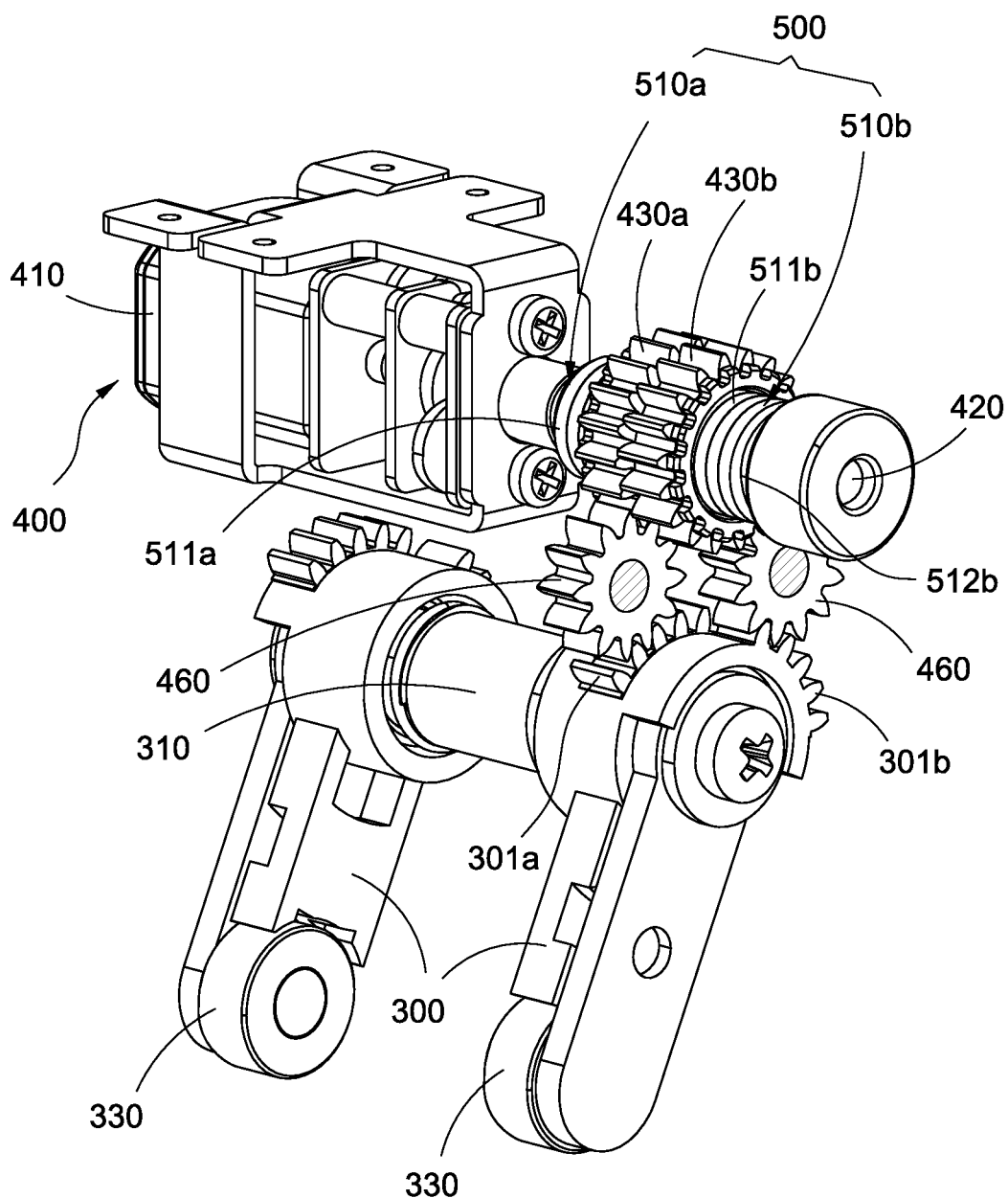
FIGS. 12 and 13 are schematic views showing the internal components and structures of a 3D printing head having an electrically descendible nozzle in accordance with the second embodiment of this disclosure.
Figure 13:
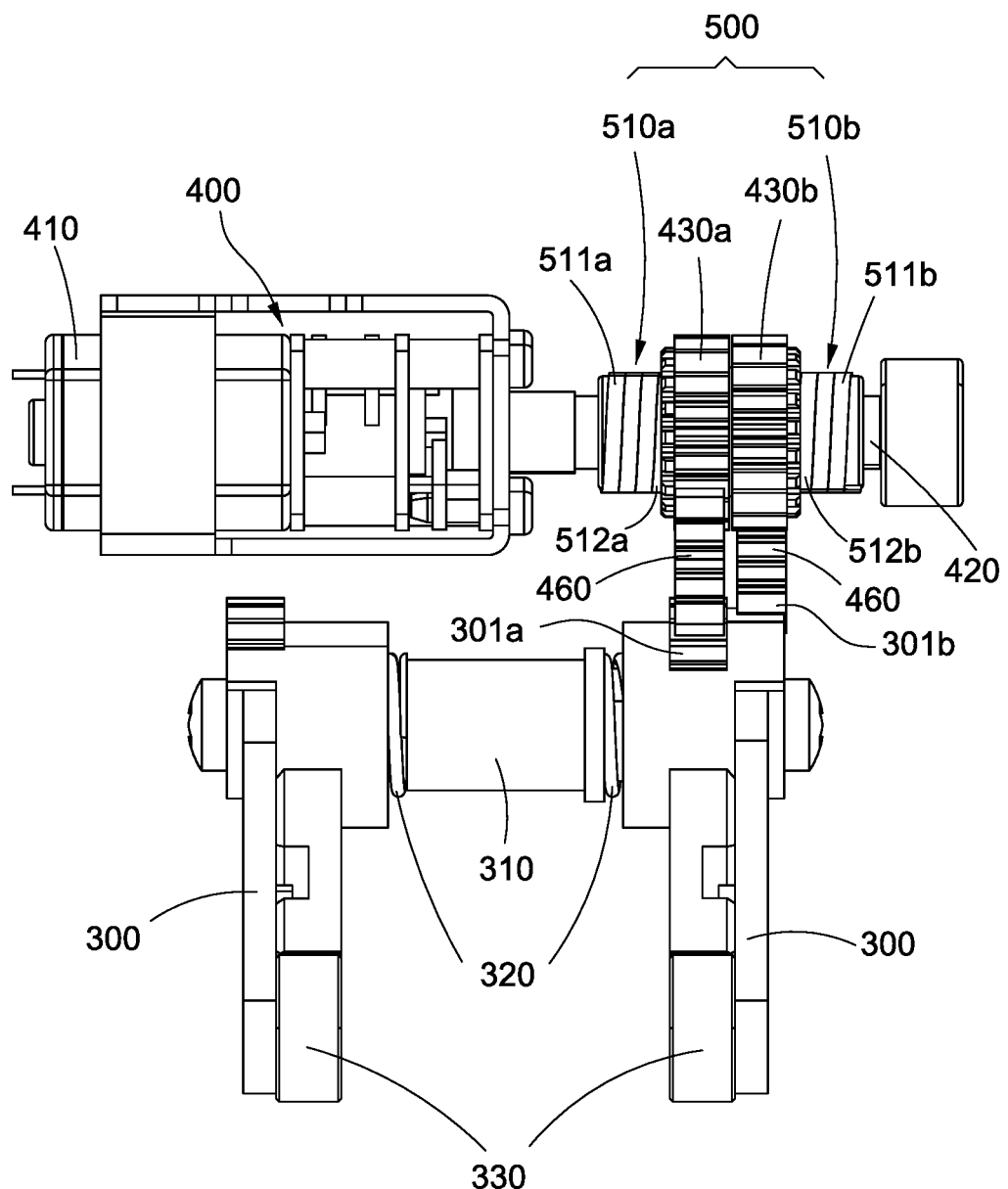
Figure 14:
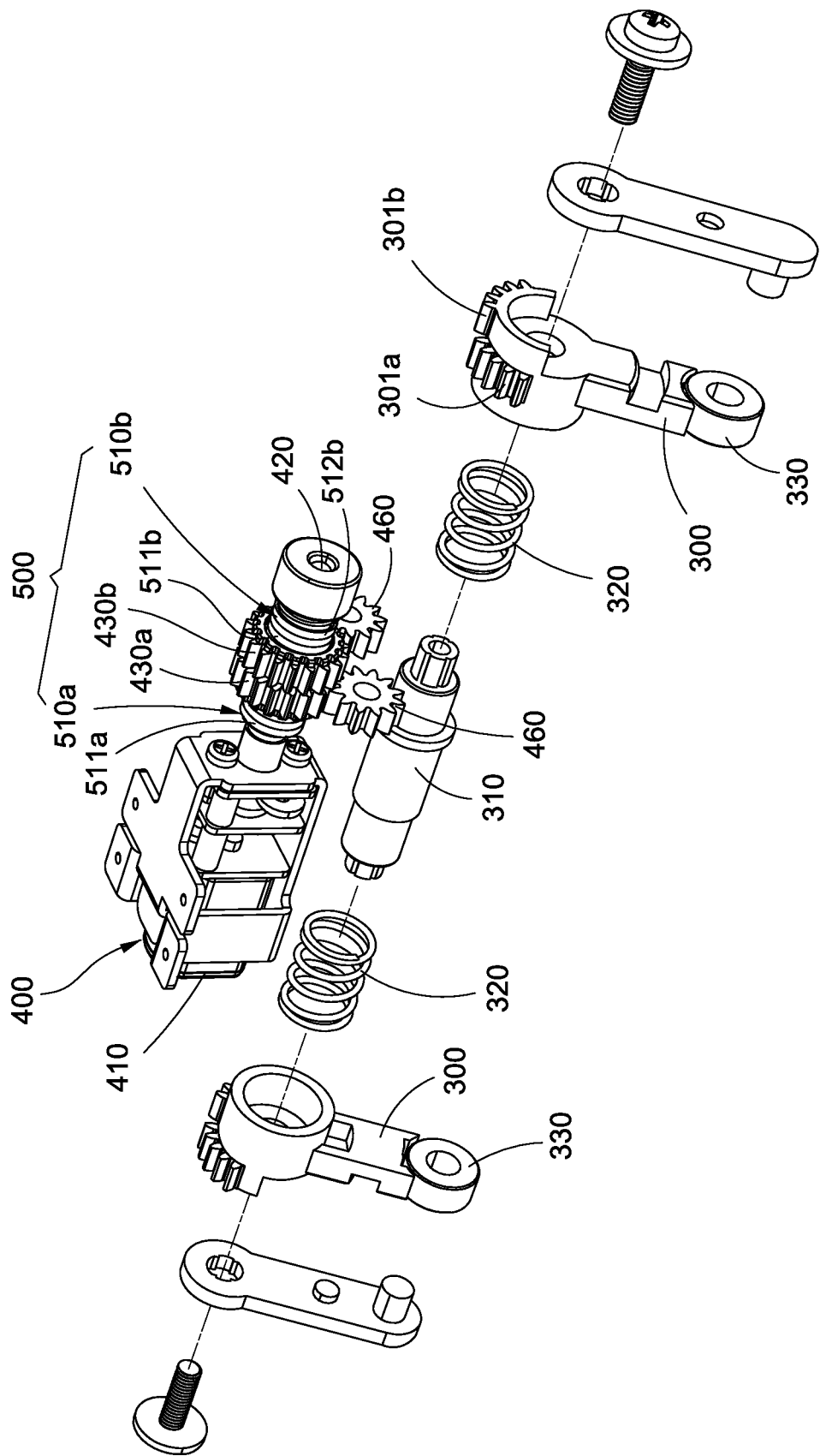
FIG. 14 is an exploded view of a 3D printing head having an electrically descendible nozzle a 3D printing head having an electrically descendible nozzle in accordance with the second embodiment of this disclosure.
Figure 15:
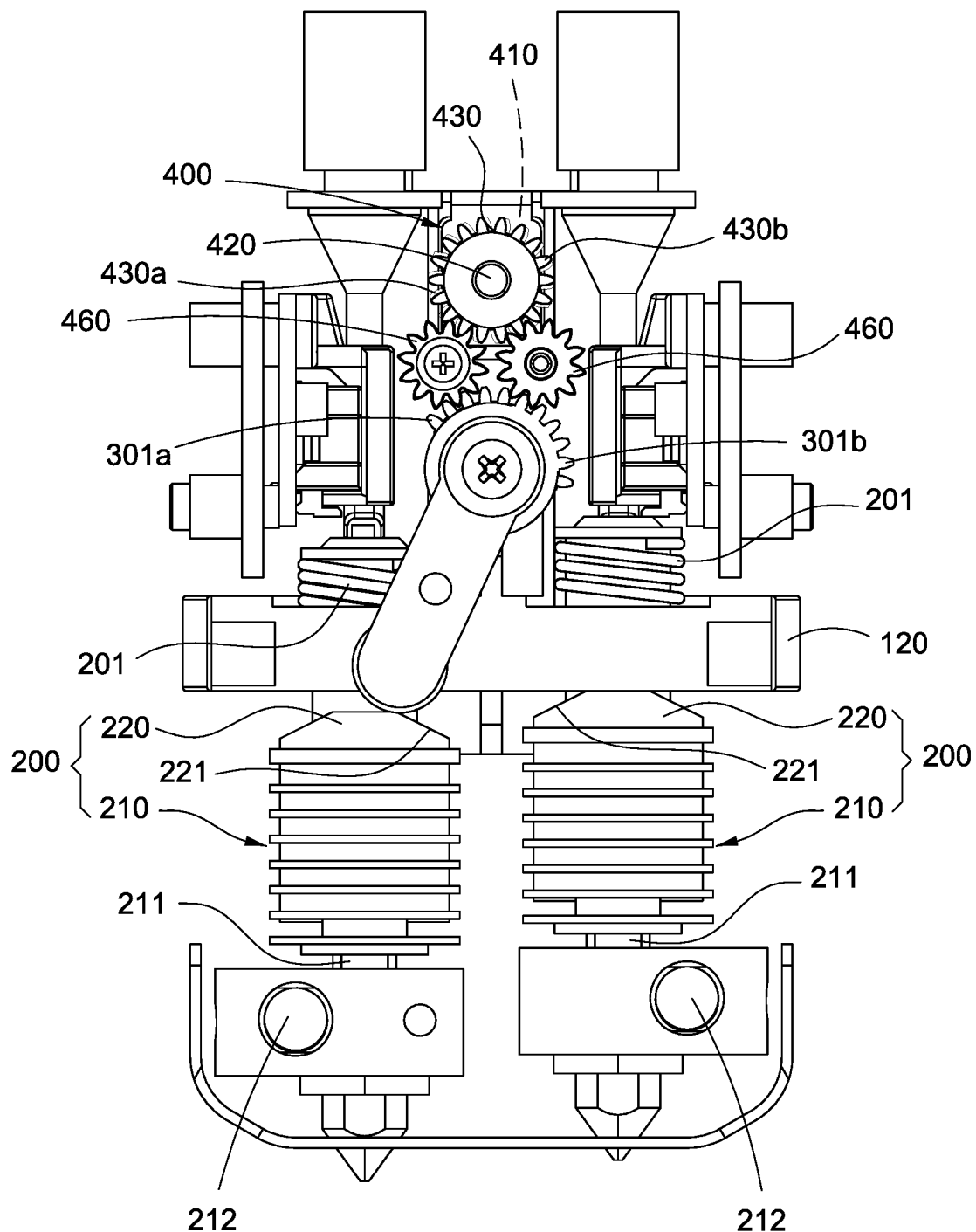
FIGS. 15 and 16 are schematic views showing the operation of a 3D printing head having an electrically descendible nozzle in accordance with the second embodiment of this disclosure.
Figure 16:
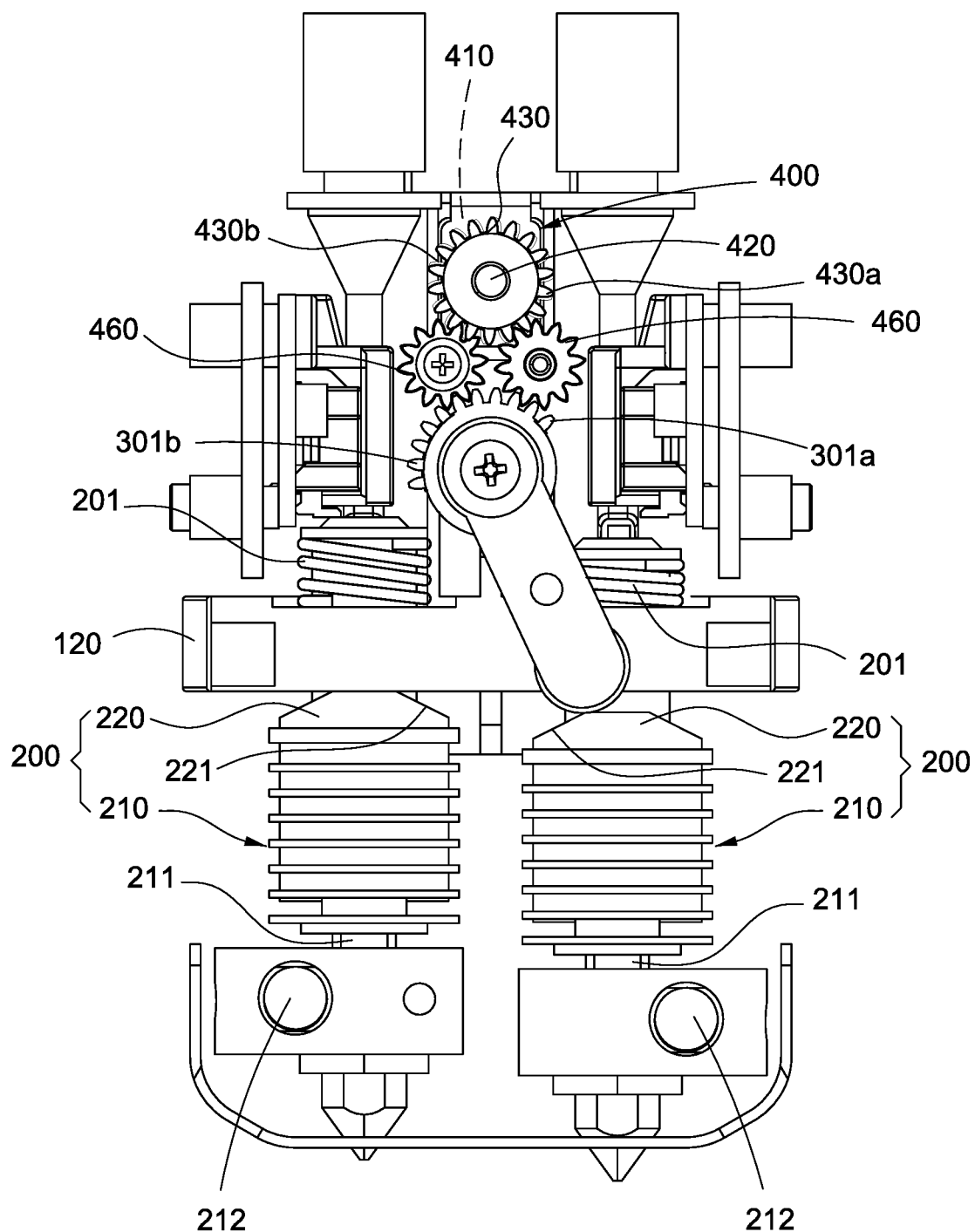

The swing arm 300 has an auxiliary steering elastic member 440 coupled to the carrier 100 in its sideway swinging direction for pulling the swing arm 300 to assist the drive gear 430 to engage the rack 301, so as to facilitate the change of direction. In addition, a positioning elastic member 450 is coupled between the swing arm 300 and the carrier 100 and provided for driving the swing arm 300 to press and position the descending nozzle 210. In this embodiment, the positioning elastic member 450 is a long-strip spiral spring, and the positioning elastic member 450 has a lower end coupled to the carrier 100 and an upper end coupled to the swing arm 300 to swing the swing arm 300, wherein the junction of the positioning elastic member 450 and the carrier 100 is situated between the pair of the nozzles 210. Regardless of which direction the swing arm 300 swings in its bidirectional stroke, the positioning elastic member 450 can press the swing arm 300 by its contraction force. After the printing is completed, the swing arm 300 can be moved selectively between the pair of nozzles 210 as shown in FIG. 9, so that each nozzle 210 is lifted to facilitate the 3D printing head to withdraw the finished product.

Figure 5:
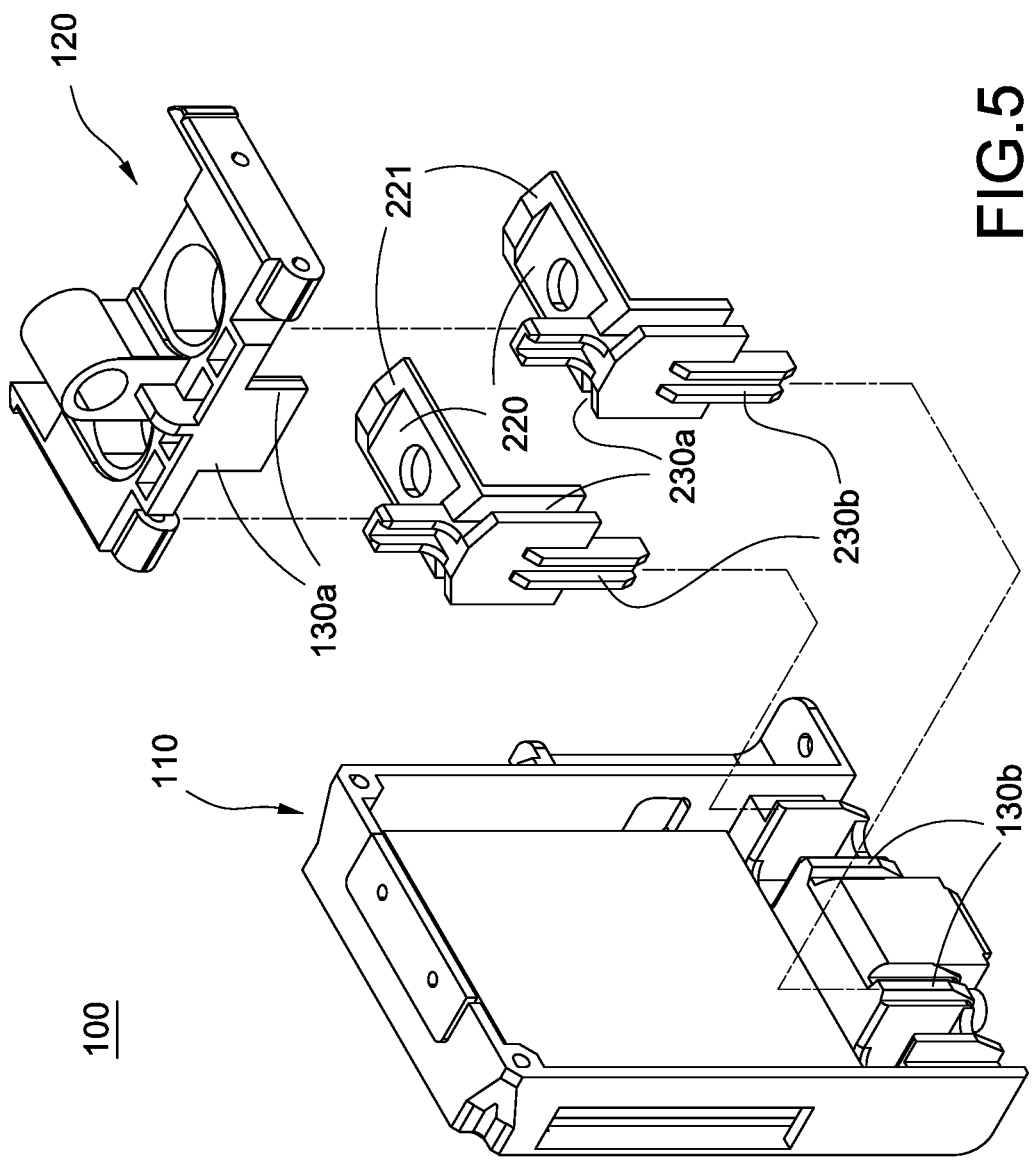

In this embodiment as shown in FIGS. 1, 5 and 6, each nozzle 210 is provided with a press plate 220 respectively, and an edge of the press plate 220 forms a slope surface 221. During the process of moving the lower end of the swing arm 300 from a side to the top of the nozzle 210, the slope surface 221 is provided for facilitating the lower end of the swing arm 300 to pass to the press plate 220, so as to press the corresponding nozzle 210. In this embodiment, both guiding structures 230a/230b are integrally coupled to the press plate 220.

Figure 2:
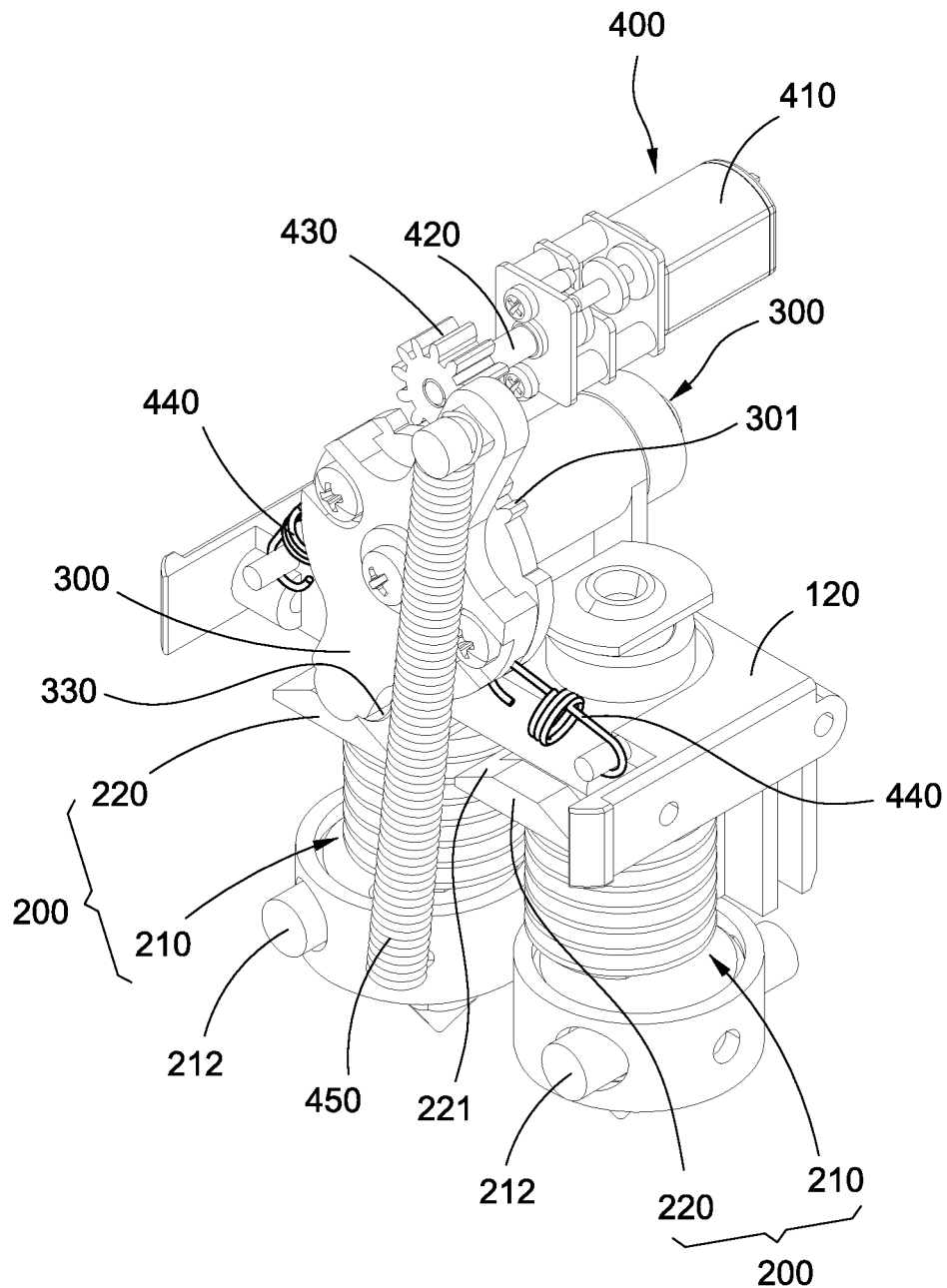
FIGS. 2 and 3 are perspective views showing the internal components and structures of a 3D printing head having an electrically descendible nozzle in accordance with the first embodiment of this disclosure.
Figure 3:
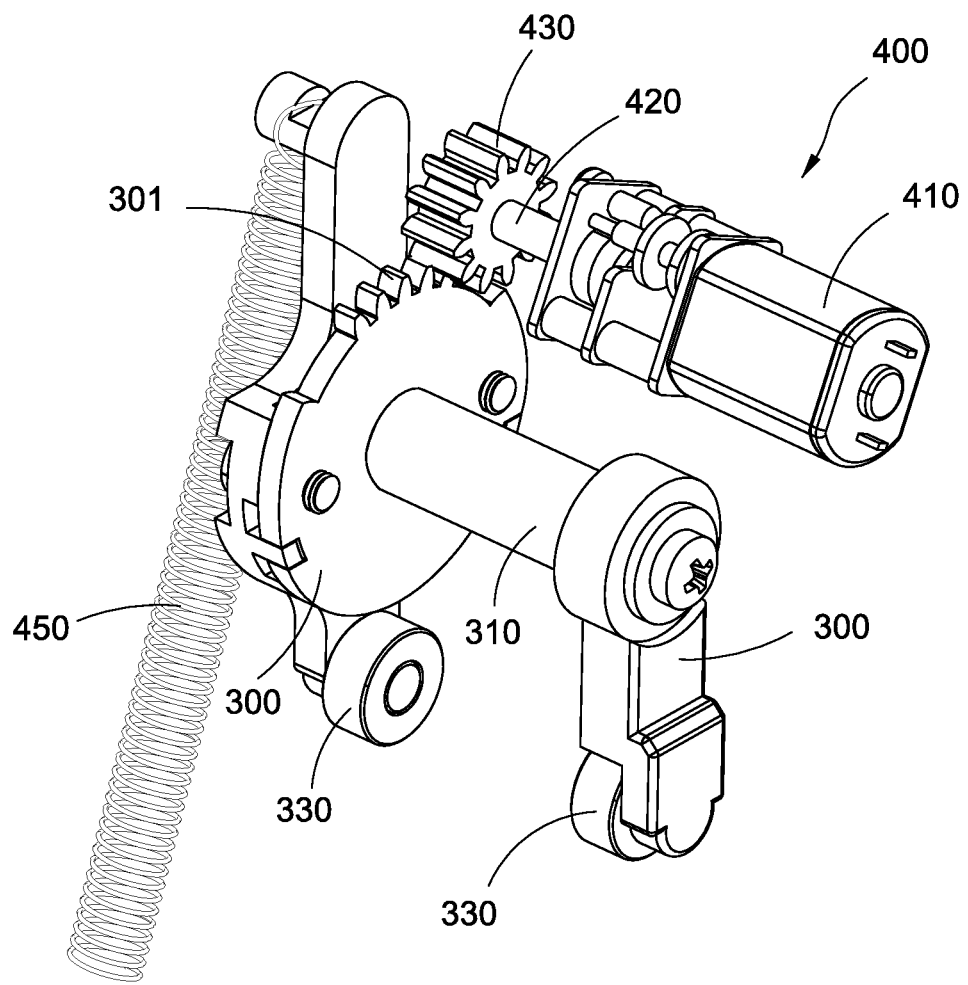
Figure 4:
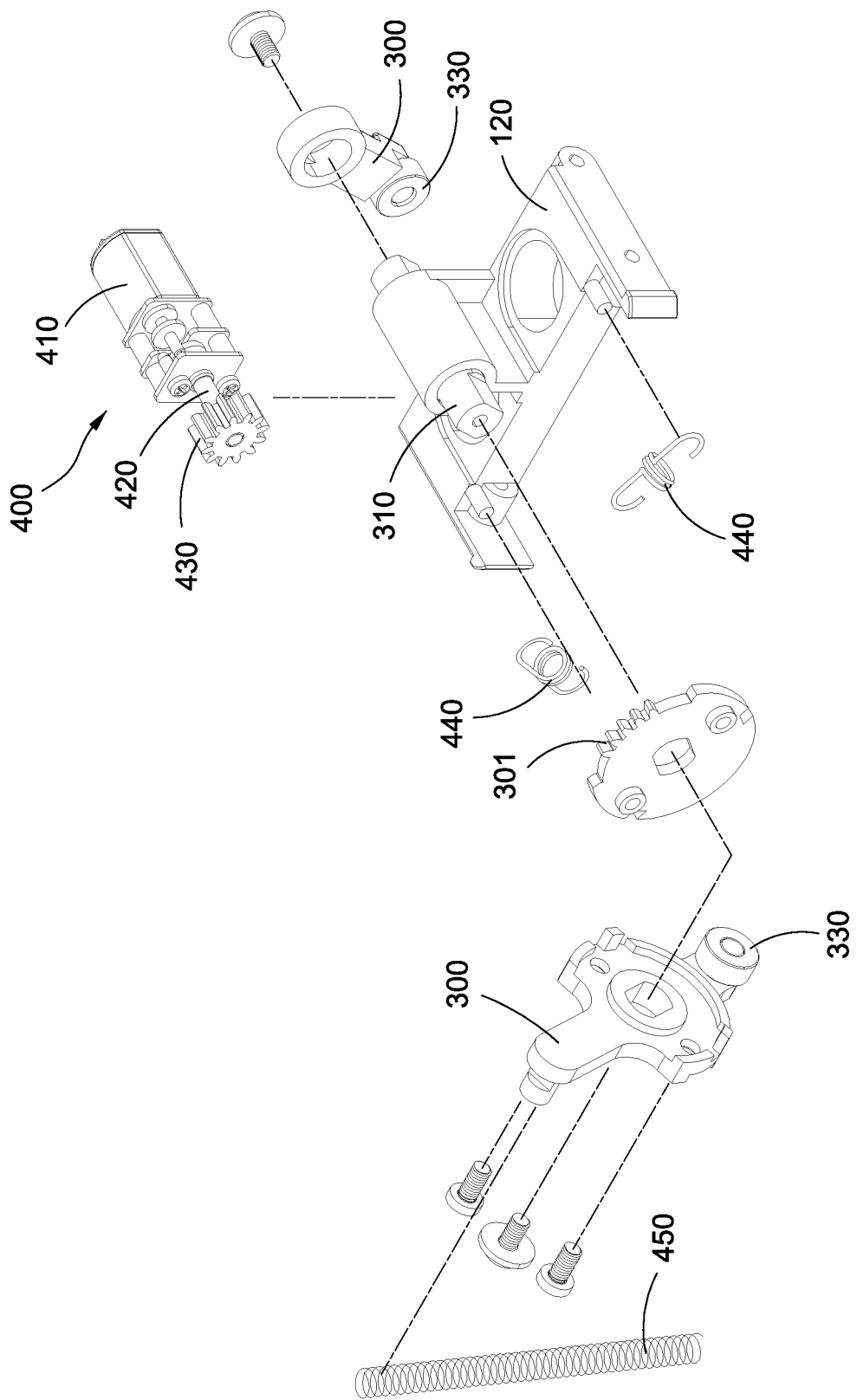
FIGS. 4 and 5 are perspective views showing the internal components and structures of a 3D printing head having an electrically descendible nozzle in accordance with the first embodiment of this disclosure.

In FIGS. 2 and 3, the simplest implementation way just needs to have a single swing arm 300 of the rack 301 in order to achieve the effect of pressing the nozzle 210 down. However, the quantity of swing arms 300 is not limited in this disclosure. In this embodiment, a pair of swing arms 300 are provided and coupled to both ends of the pivot shaft 310 respectively, and the pair of swing arms 300 are linked with each other and coaxially rotated by the pivot shaft 310. As long as there is one of the swing arms 300 having the rack 301, the pair of swing arms 300 can be engaged and linked with the driving mechanism 400 by the rack 301.

In the figures of this embodiment, the 3D printing head having an electrically descendible nozzle of this disclosure pushes the swing arm 300 to rotate by the driving mechanism 400 in order to drive the desired nozzle 210 to descend for printing. Therefore, the aforementioned simple structure can ascend and descend the nozzles 210, so that the height difference between the two nozzles 210 prevents the product from being scratched by the idle nozzle 210 when printing.

With reference to FIGS. 10 to 16 for a 3D printing head having an electrically descendible nozzle in accordance with the second embodiment of this disclosure, the 3D printing head having an electrically descendible nozzle comprises a carrier 100, a pair of nozzle assemblies 200, a swing arm 300 and a driving mechanism 400. The structure of this embodiment is substantially the same as that of the first embodiment, and only the difference between this embodiment and the first embodiment will be described in detail as follows.

The major difference between this embodiment and the first embodiment resides on the engagement method between the swing arm 300 and the driving mechanism 400. In this embodiment, the driving mechanism comprises a motor 410, a power shaft 420 coupled to the motor 410, and a pair of drive gears 430a/430b installed onto the power shaft 420, and the power shaft 420 is passed through each drive gear 430a/430b and coupled between the pair of drive gears 430a/430b with a power connection by a steering clutch mechanism 500. The steering clutch mechanism 500 comprises pair of spiral springs 510a/510b configured to be corresponsive to the drive gears 430a/430b respectively, and the pair of spiral springs 510a/510b are sheathed on the power shaft 420 and fixed to the corresponding drive gears 430a/430b, and the swing arm 300 has a pair of racks 301a/301b corresponding to the drive gears 430a/430b, and the racks 301a/301b are extended in a curve by using the pivoting center of the swing arm 300 as the center and staggered with each other, and each drive gear 430a/430b is engaged with each corresponding each rack 301a/301b. In this embodiment, each drive gear 430a/430 is indirectly engaged with each corresponding rack 301a/301 by a reduction gear 460, but each drive gear 430a/430b can also be directly engaged with each corresponding rack 301a/301b as well. When the power shaft 420 rotates in any one direction, the power shaft 420 can drive the pair of spiral springs 510a/510b to be twisted in opposite directions, so that one of the spiral springs 510a/510b is contracted radially to tighten the power shaft 420 and the other spiral spring 510a/510b is expanded radially to loosen the power shaft 420. When the power shaft 420 applies a force to drive the swing arm 300 to swing bi-directionally within the curved extending range of each corresponding rack 301a/301b, each drive gear 430a/430b applies a force to drive to assist the drive gears 430a/430b to be engaged with the corresponding racks 301a/301b and facilitates a change of direction.

In this embodiment, the simplest implementation way just needs to have a single swing arm 300 of the rack 301a/301b to achieve the effect of pressing the nozzle 210 down. However, the quantity of swing arms 300 is not limited in this disclosure. In this embodiment, a pair of swing arms 300 are provided and coupled to both ends of the pivot shaft 310 respectively, and the pair of swing arms 300 are linked with each other and coaxially rotated by the pivot shaft 310. As long as there is one of the swing arms 300 having the rack 301a/301b, the pair of swing arms 300 can be engaged and linked with the driving mechanism 400 by the rack 301a/301b.

Each spiral spring 510a/510b has an end fixed to each corresponding drive gear 430a/430b and the other end fixed to the other corresponding drive gear 430a/430b. In this embodiment, each spiral spring 510a/510b has an end closer to the motor and defined as an inner end 511a/511b and the other end defined as an outer end 512a/512b. Wherein, the spiral spring 510a is fixed to the corresponding drive gear 430a by its inner end 511a, and the other spiral spring 510b is fixed to the corresponding drive gear 430b by its outer end 512b. When the power shaft 420 rotates in any one direction, the power shaft 420 drives the pair of spiral springs 510a/510b to be twisted in opposite directions.

Therefore, the 3D printing head having an electrically descendible nozzle of this embodiment can drive the swing arm 300 to rotate by the driving mechanism 400 to descend the desired nozzle 210 for printing, and the height difference between the two nozzles 210 prevents the product from being scratched by the idle nozzle 210 when printing.

Figure 17:
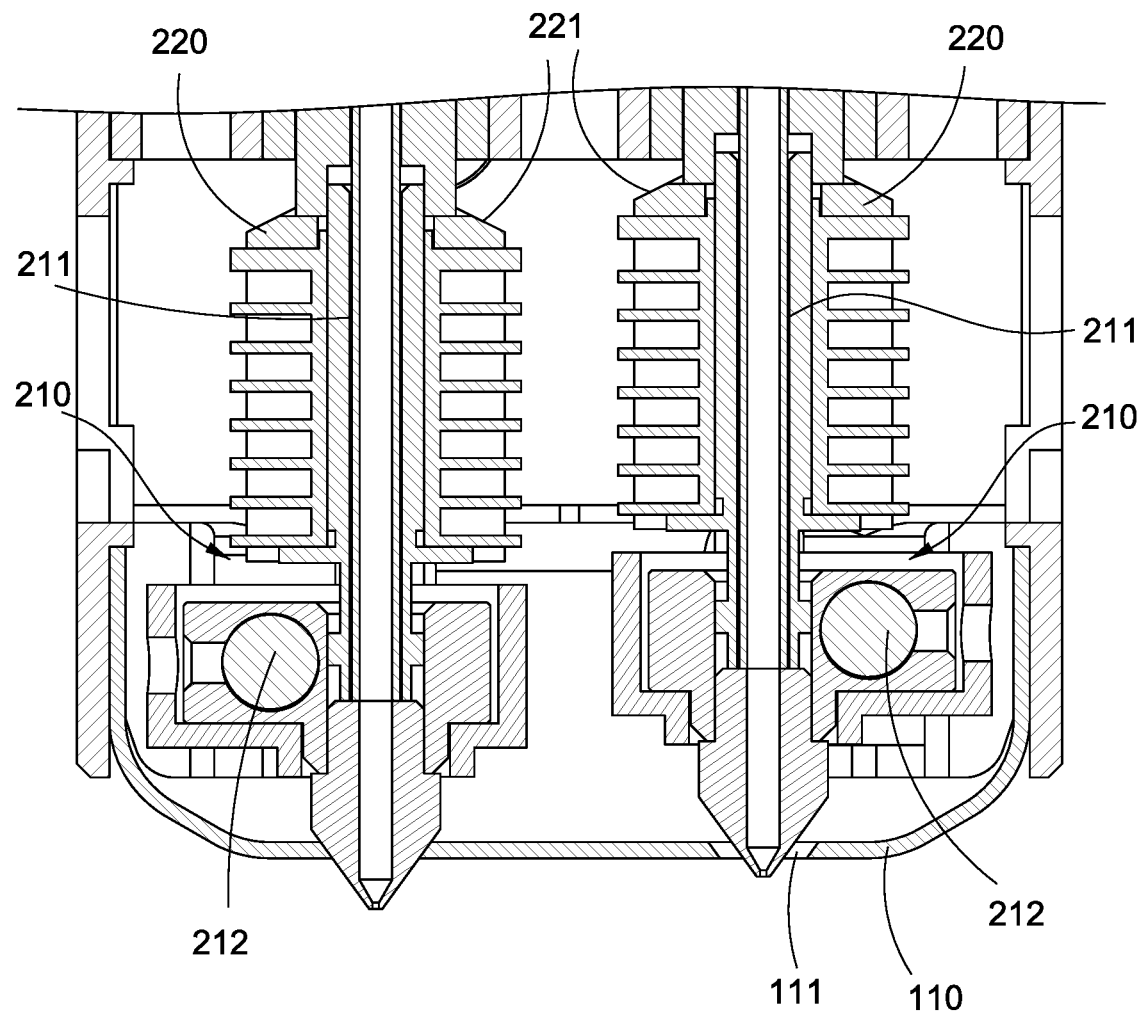
FIGS. 17 and 18 are schematic views showing different modes of a positioning hole in a 3D printing head having an electrically descendible nozzle of this disclosure.
Figure 18:
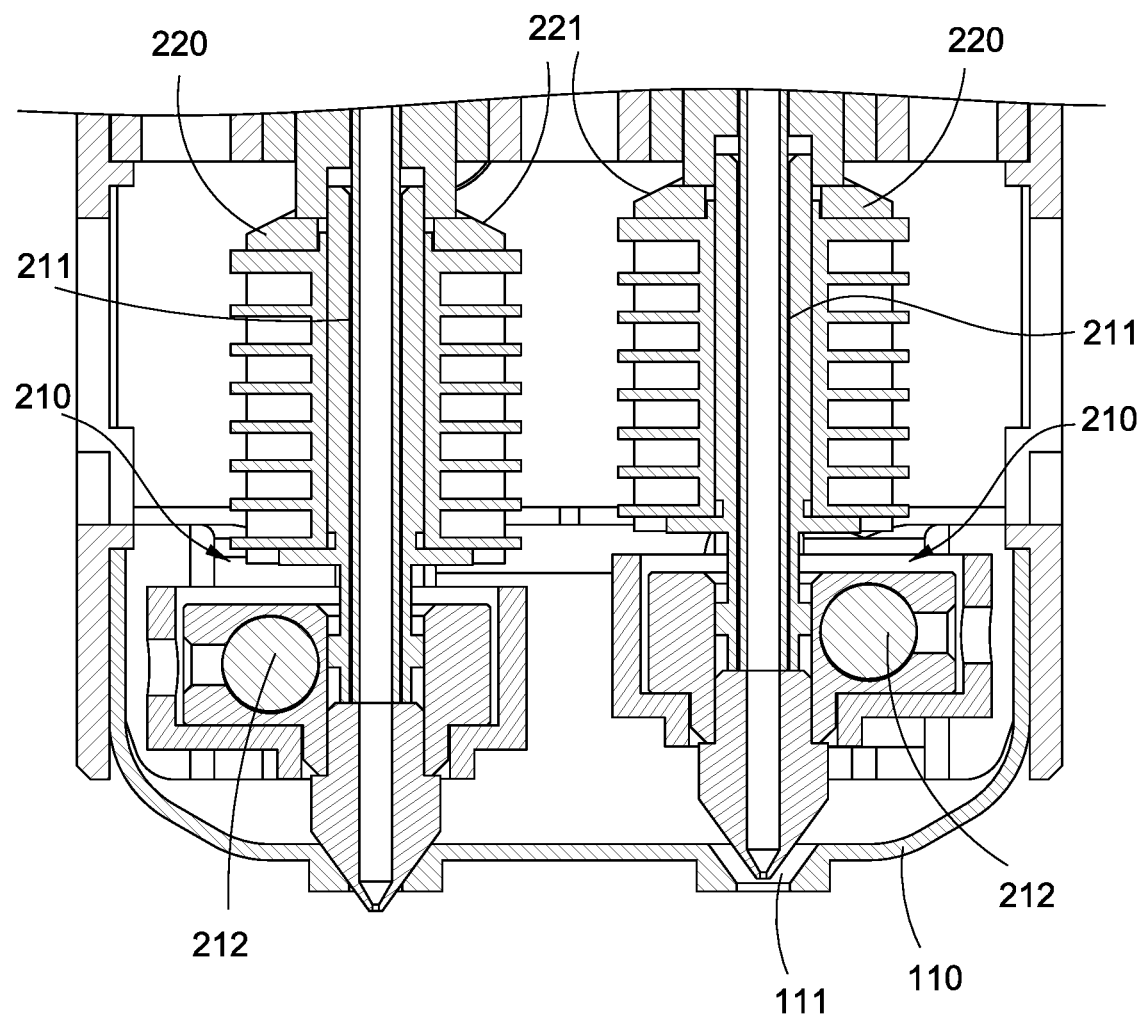

In FIGS. 17 and 18, the casing 110 of the carrier 100 has a positioning hole 111, and when the nozzle 210 descends, the positioning hole 111 is exposed from the casing 110, and the lower tip of the nozzle 210 is positioned against an inner edge of the positioning hole 111, so as to prevent the nozzle 210 from being shifted or shaken sideway while moving. In FIG. 17, the positioning hole 111 is formed on a sheet metal piece of the casing 110, and the positioning hole 111 may be a straight through hole or any downwardly tapered hole in a shape corresponding to the nozzle 210, but this disclosure is not limited by the aforementioned arrangement. In FIG. 18, the positioning hole 111 may also be formed on a plastic piece of the casing 110, and the positioning hole 111 may be a conical positioning hole 111 with a greater depth to improve the precision of positioning the nozzle 210.

While this disclosure has been described by means of specific embodiments, numerous modifications and variations could be made thereto by those skilled in the art without departing from the scope and spirit of this disclosure set forth in the claims.

What is claimed is:

1. A 3D printing head, comprising:
   a carrier;
   a pair of nozzle assemblies, disposed on the carrier, and each nozzle assembly comprising a nozzle and a reset elastic member, and each nozzle being movably coupled to the carrier and capable of moving up and down relative to the carrier, and each reset elastic member being coupled between the carrier and the corresponding nozzle and capable of lifting each nozzle relative to the carrier;
   a swing arm, pivotally coupled to the carrier, and capable of swinging and moving an end of the swing arm to a position between the nozzles and selectively pressing one of the nozzles down;
   a driving mechanism, coupled to the swing arm, capable of driving the swing arm to rotate and swing; and
   a positioning elastic member coupled between the swing arm and the carrier for driving the swing arm to press and position at least one of the nozzle.

2. The 3D printing head as claimed in claim 1, wherein the swing arm and the carrier have a pivot point situated between the nozzles.

3. The 3D printing head as claimed in claim 1, further comprising an auxiliary steering elastic member coupled between the swing arm and the carrier for assisting pulling the swing arm to change its direction.

4. The 3D printing head as claimed in claim 1, wherein the positioning elastic member swings together with the swing arm, and the positioning elastic member and the carrier have a junction situated between the nozzles.

5. The 3D printing head as claimed in claim 1, wherein the carrier comprises a casing and a retaining frame contained in the casing, and the pair of nozzle assemblies are contained in the casing and movably coupled to the retaining frame.

6. The 3D printing head as claimed in claim 5, wherein the carrier has positioning holes corresponding to each of the nozzles, wherein a lower tip of each of the nozzles is capable of being positioned against an inner edge of one of the positioning holes.

7. The 3D printing head as claimed in claim 1, wherein each of the nozzles is provided with a press plate having an edge forming a sloped surface, and the swing arm can be moved to the corresponding press plate by any one of the sloped surfaces to press the corresponding nozzle.

8. The 3D printing head as claimed in claim 1, further comprising a further swing arm, wherein the swing arm and further swing arm coaxially rotate with each other.

9. The 3D printing head as claimed in claim 1, wherein a guide wheel is pivoted on one end of the swing arm for selectively pushing one of the nozzles.

10. The 3D printing head as claimed in claim 1, wherein the driving mechanism comprises a power shaft and a drive gear sheathed on the power shaft, and the swing arm has a curved rack extending in a curve relative to a pivoting center of the swing arm, and the drive gear is engaged with the curved rack, so that the power shaft can drive the swing arm.

11. The 3D printing head as claimed in claim 1, wherein the carrier has a lifting guide rail installed thereon, and each nozzle assembly has a guiding structure engaged with the lifting guide rail.

12. A 3D printing head, comprising:
    a carrier;
    a pair of nozzle assemblies, disposed on the carrier, and each nozzle assembly comprising a nozzle and a reset elastic member, and each nozzle being movably coupled to the carrier and capable of moving up and down relative to the carrier, and each reset elastic member being coupled between the carrier and the corresponding nozzle and capable of lifting each nozzle relative to the carrier;
    a swing arm, pivotally coupled to the carrier, and capable of swinging and moving an end of the swing arm to a position between the nozzles and selectively pressing one of the nozzles down; and
    a driving mechanism, coupled to the swing arm, capable of driving the swing arm to rotate and swing, wherein the driving mechanism comprises a power shaft and a pair of drive gears, and the power shaft is passed through each drive gear and coupled between the pair of drive gears with a power connection by a steering clutch mechanism, and the steering clutch mechanism comprises a pair of spiral springs corresponding to the drive gears respectively, and the pair of spiral springs are sheathed on the power shaft and fixed to the corresponding drive gears respectively, and the swing arm has a pair of curved racks corresponding to the drive gears respectively, and each curved rack is extended in a curve relative to a pivoting center of the swing arm, and each drive gear is respectively engaged with one of the curved rack, so that when the power shaft rotates in any one direction, the power shaft drives the pair of spiral springs to be twisted in opposite direction with respect to each other, and one of the spiral springs is contracted radially to tighten the power shaft and the other spiral spring is expanded radially to loosen the power shaft, and the power shaft is capable of applying a force by each drive gear to drive the swing arm to swing bi-directionally.

13. The 3D printing head as claimed in claim 12, wherein each spiral spring has one end coupled to the corresponding drive gear, and another end coupled to the other corresponding drive gear.

14. The 3D printing head as claimed in claim 12, wherein the swing arm is pivoted to the carrier by a pivot shaft, and the pivot shaft is pivotally coupled to the carrier and the pivot shaft is passed and coupled to the swing arm, and a compression spring having two ends is sheathed on the pivot shaft, and both ends of the compression spring press and couple the carrier and the swing arm respectively.

15. The 3D printing head as claimed in claim 12, wherein the carrier has a lifting guide rail installed thereon, and each nozzle assembly has a guiding structure engaged with the lifting guide rail.

* * * * *